(12) United States Patent
Takata

(10) Patent No.: US 7,931,383 B2
(45) Date of Patent: Apr. 26, 2011

(54) ILLUMINATION DEVICE, DISPLAY DEVICE AND TELEVISION RECEIVER

(75) Inventor: Yoshiki Takata, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 375 days.

(21) Appl. No.: 12/097,565

(22) PCT Filed: Oct. 4, 2006

(86) PCT No.: PCT/JP2006/319867
§ 371 (c)(1),
(2), (4) Date: Jun. 16, 2008

(87) PCT Pub. No.: WO2007/077657
PCT Pub. Date: Jul. 12, 2007

(65) Prior Publication Data
US 2009/0262519 A1  Oct. 22, 2009

(30) Foreign Application Priority Data
Jan. 5, 2006  (JP) ................. 2006-000381

(51) Int. Cl.
*G09F 13/12* (2006.01)
*F21S 4/00* (2006.01)
*F21V 13/04* (2006.01)

(52) U.S. Cl. ... 362/97.1; 362/224; 362/245; 362/311.06

(58) Field of Classification Search ................. 362/97.1, 362/97.2, 245, 616, 97.3, 97.4, 224, 225, 362/311.06
See application file for complete search history.

(56) References Cited

U.S. PATENT DOCUMENTS

| | | | |
|---|---|---|---|
| 6,561,663 B2 * | 5/2003 | Adachi et al. | 362/616 |
| 6,989,873 B2 * | 1/2006 | Hua-Nan et al. | 349/64 |
| 6,995,815 B2 * | 2/2006 | Tsai | 362/245 |
| 7,080,933 B2 * | 7/2006 | Chen et al. | 362/616 |

(Continued)

FOREIGN PATENT DOCUMENTS

CN 1534353 A 10/2004

(Continued)

OTHER PUBLICATIONS

Official Communication issued in International Patent Application No. PCT/JP2006/319867, mailed on Dec. 12, 2006.

(Continued)

*Primary Examiner* — Alan Cariaso
(74) *Attorney, Agent, or Firm* — Keating & Bennett, LLP

(57) ABSTRACT

An illumination device is provided on a backside of a display panel so as to irradiate a display panel with light, the illumination device including a plurality of rod-like light sources arranged in a planar configuration such that they do not cross each other, and columnar members being respectively provided adjacent to the rod-like light sources, each columnar member including a light incidence plane through which light emitted from a longitudinal direction of the rod-like light sources enters, a first light exit plane arranged to emit the incoming light from the light incidence plane toward the display panel, and a first light reflecting plane arranged to reflect the incoming light from the light incidence plane to the light exit plane. Therefore, with the illumination device applied as a direct backlight, it is possible to reduce luminance unevenness in both a front direction and oblique directions sufficiently, so as to reduce the luminance unevenness of the backlight sufficiently, as a whole.

9 Claims, 12 Drawing Sheets

U.S. PATENT DOCUMENTS

| | | | |
|---|---|---|---|
| 7,106,394 B2 * | 9/2006 | Ono et al. | 349/62 |
| 7,255,462 B2 * | 8/2007 | Tseng | 362/330 |
| 7,303,325 B2 * | 12/2007 | Takata | 362/246 |
| 7,413,318 B2 * | 8/2008 | Hsu et al. | 362/97.1 |
| 7,581,850 B2 * | 9/2009 | Liao | 362/245 |
| 7,726,826 B2 * | 6/2010 | Kusano et al. | 362/97.1 |
| 2002/0057405 A1 | 5/2002 | Morishita et al. | |
| 2004/0189892 A1 | 9/2004 | Ono et al. | |
| 2005/0117322 A1 | 6/2005 | Takata | |
| 2006/0274547 A1 * | 12/2006 | Kao et al. | 362/560 |
| 2007/0222916 A1 | 9/2007 | Kohara et al. | |
| 2008/0212338 A1 | 9/2008 | Kohara et al. | |

FOREIGN PATENT DOCUMENTS

| | | | |
|---|---|---|---|
| CN | 1578915 A | 2/2005 | |
| CN | 2696006 Y | 4/2005 | |
| JP | 02-037604 A | 2/1990 | |
| JP | 05-027237 A | 2/1993 | |
| JP | 09-186825 A | 7/1997 | |
| JP | 2000-310776 A | 11/2000 | |
| JP | 2001-060068 A | 3/2001 | |
| JP | 2001-093321 A | 4/2001 | |
| JP | 2001-133779 A | 5/2001 | |
| JP | 2003-068104 A | 3/2003 | |

OTHER PUBLICATIONS

Official Communication issued in corresponding Chinese Patent Application No. 200680050503.3, mailed on Sep. 18, 2009.

* cited by examiner

ILLUMINATION DEVICE, DISPLAY DEVICE AND TELEVISION RECEIVER

BACKGROUND OF THE INVENTION

1. Field of the Invention

The present invention relates to an illumination device and a display device including the illumination device, and, in particular, to an illumination device provided on a backside of a display panel and used as a backlight of a display device, and to a display device including such an illumination device.

2. Description of the Related Art

It has been known that a liquid crystal display device is widely used for office automation equipment, an in-car TV, a monitor of a video camera and the like, because the liquid crystal display device has a lightweight and thin body, and has low power consumption. Unlike a display device which uses an element that emits light by itself, such as a CRT, a PDP (plasma display panel), and an EL (electroluminescence), the liquid crystal display device uses a liquid crystal display element that does not emit light by itself. Therefore, a transmissive liquid crystal display device has a planar illumination device called a "backlight" on a backside of the liquid crystal display element. At each pixel, the liquid crystal display element controls transmission of light from the backlight, so as to display images.

The backlight is roughly classified into a "direct" backlight in which a plurality of rod-like light sources, such as fluorescent tubes, are provided directly below the liquid crystal display element, and an "edge light type" backlight in which a light source is provided at an end of a light guide plate, and the light guide plate leads light from the light source to the liquid crystal display element.

A general arrangement of the direct backlight is schematically illustrated in FIG. 16. In FIG. 16, a backlight 40 is provided on a backside of a transmissive liquid crystal display panel 48, the backlight 40 including a plurality of fluorescent tubes 41 positioned at prescribed intervals, a case 43 for containing the fluorescent tubes 41, and an optical sheet 45 (such as a diffuser sheet or a prism sheet) provided between the fluorescent tubes 41 and the liquid crystal display panel 48.

With this arrangement, the direct backlight 40 can adjust its luminance easily by increasing or decreasing the number of the fluorescent tubes 41, which act as a light source, so that the direct backlight 40 can achieve a high luminance easier than the edge light type backlight. Consequently, the direct backlight 40 is usually used for a large liquid crystal display device.

However, with the direct backlight 40, the light sources (fluorescent tubes) 41 are provided directly below the liquid crystal display panel 48 at discrete intervals. Therefore, regions directly above the light sources 41 have a high luminance, while regions corresponding to the intervals between the light sources 41 has a low luminance, thereby resulting in an occurrence of luminance unevenness.

The longer a distance A between the light sources 41 and the liquid crystal display panel 48 is, and the shorter a distance B between the light sources 41 is, the less the luminance unevenness there is. In short, the smaller a ratio R of the distance B to A (=B/A) is, the less the luminance unevenness there is, and the bigger the ratio R is, the more the luminance unevenness there is. Therefore, the luminance unevenness can be reduced with a longer distance A between the light sources 41 and the liquid crystal display panel 48 or with a shorter distance B between the light sources 41 by increasing the number of the light sources 41.

However, such a longer distance A between the light sources 41 and the liquid crystal display panel 48 requires the backlight 40 or a display device to be thick, thereby resulting in poor commercial attractiveness. Moreover, shortening the distance B between the light sources 41 by increasing the number of the light sources 41 results in an increase in cost, again thereby resulting in poor commercial attractiveness as well.

In order to reduce the luminance unevenness, Japanese Unexamined Patent Application Publication No. 2002-122863 discloses a backlight 50. The backlight 50 includes, as illustrated in FIG. 17, a protruding portion 52 formed between light sources 51. The protruding portion 52 has a triangle cross sectional shape and a light reflectivity. Thereby, the luminance unevenness is reduced in the backlight 50.

Further, Japanese Unexamined Patent Application Publication No. 2000-310776 discloses a backlight 60. The backlight 60, as illustrated in FIG. 18, includes an auxiliary light source 64 including a primary light source 62 and a light guide plate 63, the auxiliary light source 64 provided to face a liquid crystal panel across light sources 61. Thereby, the luminance unevenness is reduced in the backlight 60.

Furthermore, according to Japanese Unexamined Patent Application Publication No. 2000-310776, on a surface of the light guide plate 63, scattering dot patterns are formed to take out light outwardly, the light entering the light guide plate 63 from the primary source 62. The scattering dot patterns are sparsely arranged in a region directly below the light source 61, and densely in regions corresponding to the intervals between the light sources 61. As a result, it is possible to have a low luminance of the light coming from the light guide plate 63 in the regions directly below the light sources 61, and have a high luminance of the light in the regions corresponding to the intervals between the light sources 61, so as to reduce the luminance unevenness.

However, with the backlights disclosed in Japanese Unexamined Patent Application Publication No. 2002-122863 and Japanese Unexamined Patent Application Publication No. 2000-310776, the luminance unevenness is not reduced sufficiently. Specifically, with the backlights disclosed in Japanese Unexamined Patent Application Publication No. 2002-122863 and Japanese Unexamined Patent Application Publication No. 2000-310776, in a front direction (a normal direction of the display surface of a display device), the luminance unevenness is reduced sufficiently, however, in oblique directions (oblique directions to a normal direction of the display surface), the luminance unevenness is not reduced sufficiently, thereby resulting in the luminance unevenness of the backlights, as a whole.

SUMMARY OF THE INVENTION

In view of the problems described above, preferred embodiments of the present invention provide an illumination device of the direct backlight, and the display device with the illumination device, the illumination device and display device achieving sufficient reduction in the luminance unevenness in both the front direction and the oblique directions, and consequently achieving sufficient reduction in the luminance unevenness of the backlight, as a whole.

The illumination device according to a preferred embodiment of the present invention is provided on a backside of a display panel, for irradiating the display panel with light, the illumination device including a plurality of rod-like light sources being arranged in a planar configuration in such a manner that they do not cross each other, and columnar members being respectively arranged adjacent to the rod-like light sources, each columnar member including a light incidence plane through which light emitted from a longitudinal direction of the rod-like light source enters, a first light exit plane arranged to emit the incoming light from the light incidence plane toward the display panel, and a first light reflecting plane being arranged to reflect the incoming light from the light incidence plane to the light exit plane.

With this arrangement described above, the columnar member leads the light from the longitudinal direction of the rod-like light source adjacent thereto, to the light incidence plane, and then to the light reflecting plane, after that, to the first light exit plane, so as to allow the display panel to be irradiated with the light not from a position of the rod-like light source but from a position of the columnar member. That is to say, the columnar member acts like a light source in a pseudo manner, to irradiate the display panel with the light, and thus, to allow the illumination device to seemingly have additional rod-like light sources.

Moreover, the incoming light from the light incidence plane of the columnar member is reflected from the first light reflecting plane, and led to the first light exit plane, so as to have the same luminance of the light emitted from the first light exit plane toward the display panel as a luminance of the light emitted from the rod-like light source.

With the columnar member being disposed between the rod-like light sources, it is possible to achieve a higher luminance in a region where a luminance is low between the rod-like light sources, so as to eliminate the luminance unevenness of a surface of the display panel.

Further, with the columnar member, the number of the rod-like light sources can be increased seemingly so that the luminance unevenness is reduced sufficiently in both the front direction and the oblique directions. Therefore, the luminance unevenness of the illumination device, as a whole, is reduced sufficiently.

Furthermore, with the columnar member, the number of the rod-like light sources can be increased seemingly without an increase in the number of actual rod-like light sources. As a result, it is possible to shorten the distance between the light sources and the display panel, thereby enabling the illumination device to be made thin.

In addition, it is possible to reduce power consumption of the illumination device by decreasing the number of the rod-like light sources.

It is preferable that the first light reflecting plane performs total reflection of the incoming light from the light incidence plane to the first light exit plane.

With the first light reflecting plane for performing total reflection of the incoming light from the light incidence plane to the light exit plane, it is possible to achieve a higher luminance.

With a light reflecting sheet for reflecting light, being positioned on one side with respect to the rod-like light source and the columnar member while the display panel is positioned on the other side with respect to the rod-like light source and the columnar member, the columnar member can include a second light exit plane arranged to emit the incoming light from the light incidence plane toward the light reflecting sheet, and a second light reflecting plane arranged to reflect the incoming light from the light incidence plane to the second light exit plane.

With the columnar member arranged as described above, the display panel is irradiated directly with the incoming light, which comes from the light incidence plane and is reflected with the first light reflecting plane, and then lead to the first light exit plane, at the same time, the display panel is irradiated with another incoming light, which comes from the light incidence plane and is reflected from the second light reflecting plane, and then led to the second light exit plane, after that, reflected with the light reflecting sheet. As a result, it is possible to achieve a further higher luminance in regions of the display panel, the regions corresponding to the columnar members.

This arrangement makes it possible to irradiate the display panel more efficiently with the light entering the columnar member from the rod-like light source, so as to enable to have a longer distance between the rod-like light sources and the columnar member, and also to enable a smaller number of the rod-like light sources.

It is preferable that the second light reflecting plane performs total reflection of the incoming light from the light incidence plane to the second light exit plane.

With the second light reflecting plane for performing total reflection of the incoming light from the light incidence plane to the second light exit plane, a still further higher luminance can be achieved. Examples of the columnar member are specifically described below.

The columnar member preferably may have a quadrangular column shape, and be made of non-light scattering materials, for example. The quadrangular column shape preferably has at least one plane being inclined at about 45 degrees relative to a light exit plane of that rod-like light source adjacent to the columnar member, which light exit plane irradiates the columnar member with light.

The quadrangular column can preferably have a square cross sectional shape vertical to a longitudinal direction thereof, for example.

A longitudinal central axis of the columnar member and longitudinal central axes of a plurality of the rod-like light sources may be positioned on the same plane.

The illumination device according to a preferred embodiment of the present invention is suitable for use as the illumination device of the display device including the display panel for displaying images by modulating light, and the illumination device provided on the backside of the display panel, for irradiating the display panel with light.

Further, the display device according to a preferred embodiment of the present invention may be used as the display device of a television receiver including a tuner section for receiving a television broadcast, and the display device for displaying the television broadcast received at the tuner section.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

First Preferred Embodiment

In accordance with the present preferred embodiment of the present invention, an illumination device according to the present invention is described below as in a case where the illumination device is provided to a liquid crystal display device, which is to be used as a display device.

Figure 1:
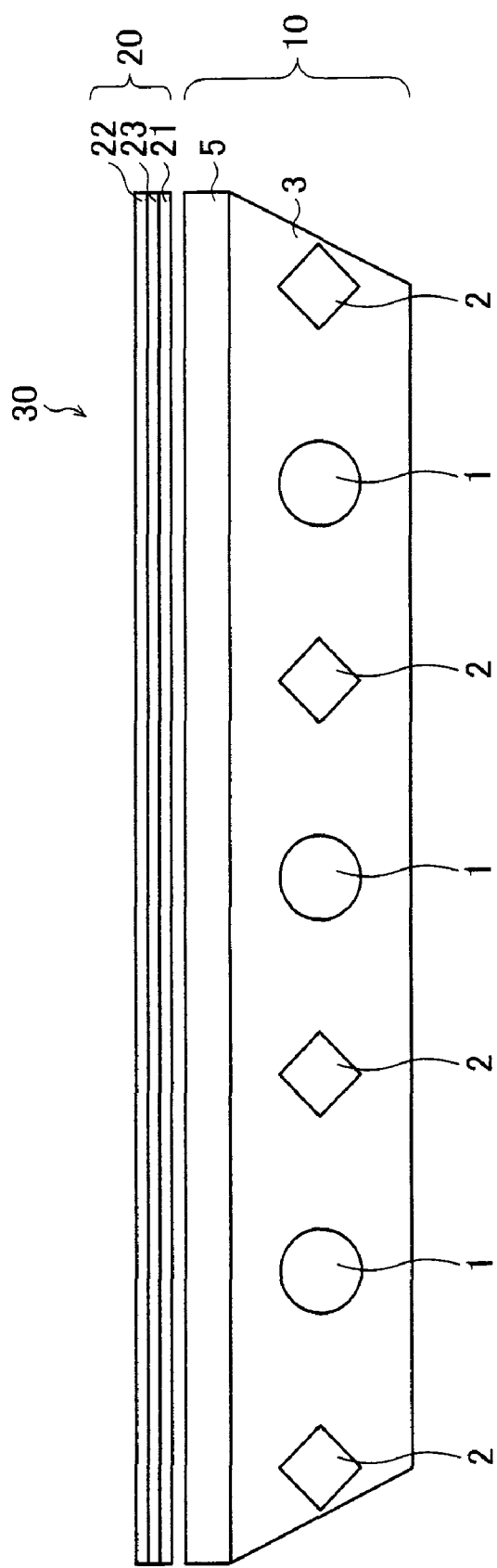
FIG. 1 is a schematic cross-section view of a liquid crystal display device in accordance with a preferred embodiment of the present invention.

FIG. 1 is a schematic cross-section view of a liquid crystal display device 30 in accordance with the present preferred embodiment.

The liquid crystal display device 30, as illustrated in FIG. 1, includes an illumination device 10 provided on a backside (the backside to a viewer's sight) of a liquid crystal display panel 20, as a direct backlight.

The liquid crystal display panel 20 includes a pair of substrates (such as glass substrates) 21 and 22, and a liquid crystal layer 23 provided between the substrates 21 and 22. The liquid crystal layer 23 modulates light from the illumination device 10 provided on the backside of the liquid crystal display panel 20, so as to display images. The liquid crystal display panel 20 has a region to display images at each pixel in a transmissive mode. In short, the liquid crystal display panel 20 is a transmissive liquid crystal display panel or a transflective liquid crystal display panel.

The illumination device 10 includes a plurality of rod-like light sources 1, which are positioned substantially parallel to each other, a plurality of pseudo rod-like light sources (columnar members) 2, which are positioned substantially parallel to each other. The rod-like light sources 1 and pseudo rod-like light sources 2 function as light sources for the liquid crystal display panel 20. The illumination device 10 also includes a case 3 in which holds these rod-like light sources 1 and pseudo rod-like light sources 2 as if the case 3 covers the rod-like light sources 1 and pseudo rod-like light sources 2.

In order to achieve high utilization efficiency of the light of the illumination device 10, the case 3 has a highly reflective member (such as a light reflecting sheet) on its internal surface (on a side facing each rod-like light source 1 and each pseudo rod-like light source 2). In order to achieve high utilization efficiency of the light, the case 3 itself may be made of a material having a high reflectivity, in addition to the configuration in which the high reflective member is provided inside the case 3, as described above.

Between the liquid crystal panel 20 and the illumination device 10, an optical sheet 5 formed from a diffusion sheet, a prism sheet and/or the like, is preferably provided. Practically, the optical sheet 5 is made by combining the diffusion sheet, the prism sheet and the like arbitrarily.

Figure 2:
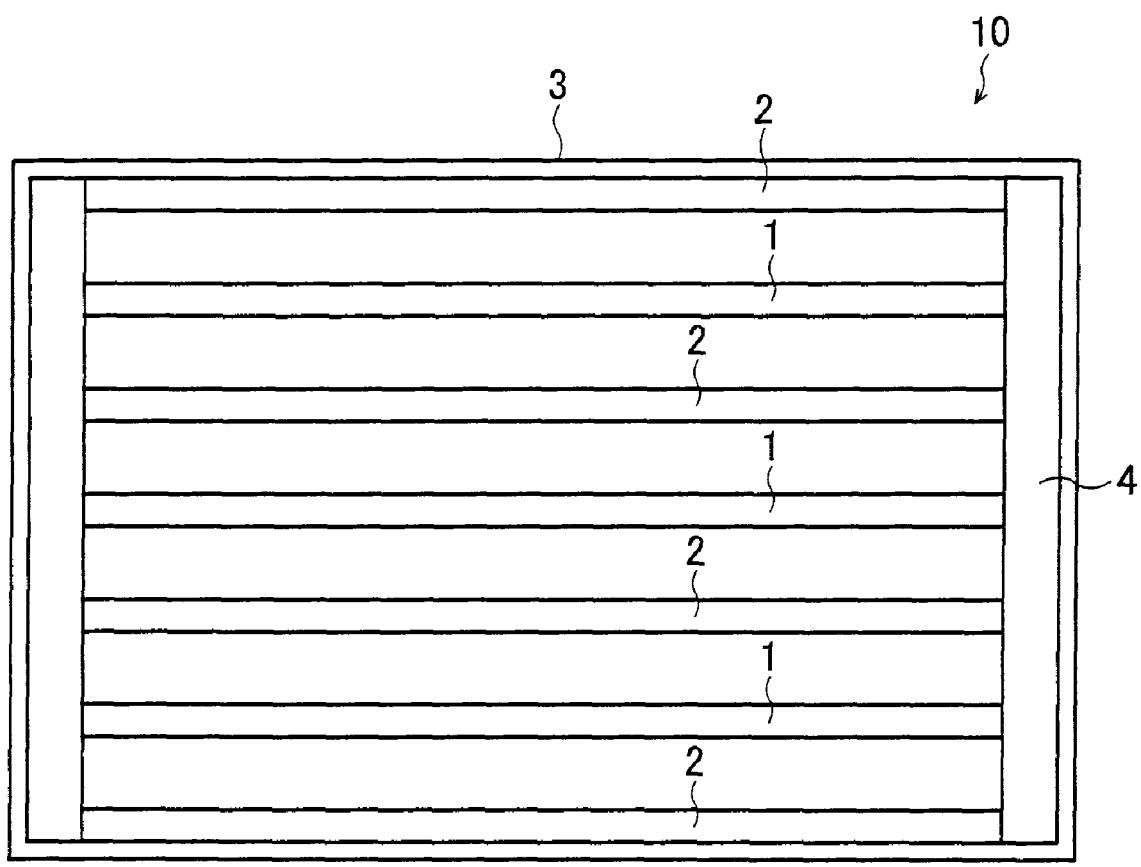
FIG. 2 is a schematic plan view of an illumination device provided to the liquid crystal display device illustrated in FIG. 1.

With the illumination device 10, the rod-like light source 1 and the pseudo rod-like light source 2 are positioned alternately, and, as illustrated in FIG. 2, they are secured with a holder 4, which is provided inside the case 3 as a supporting member. That is to say, between the two rod-like light sources 1 that are adjacent to each other, the pseudo rod-like light source 2 is arranged to be substantially parallel to the rod-like light sources 1, the pseudo rod-like light source 2 having a function to act as a pseudo light source that receives light of the rod-like light sources 1, and performing lighting toward a display surface of the liquid crystal display 20.

The rod-like light source 1 may be a cold cathode fluorescent tube or a hot cathode fluorescent tube, for example.

Figure 3:
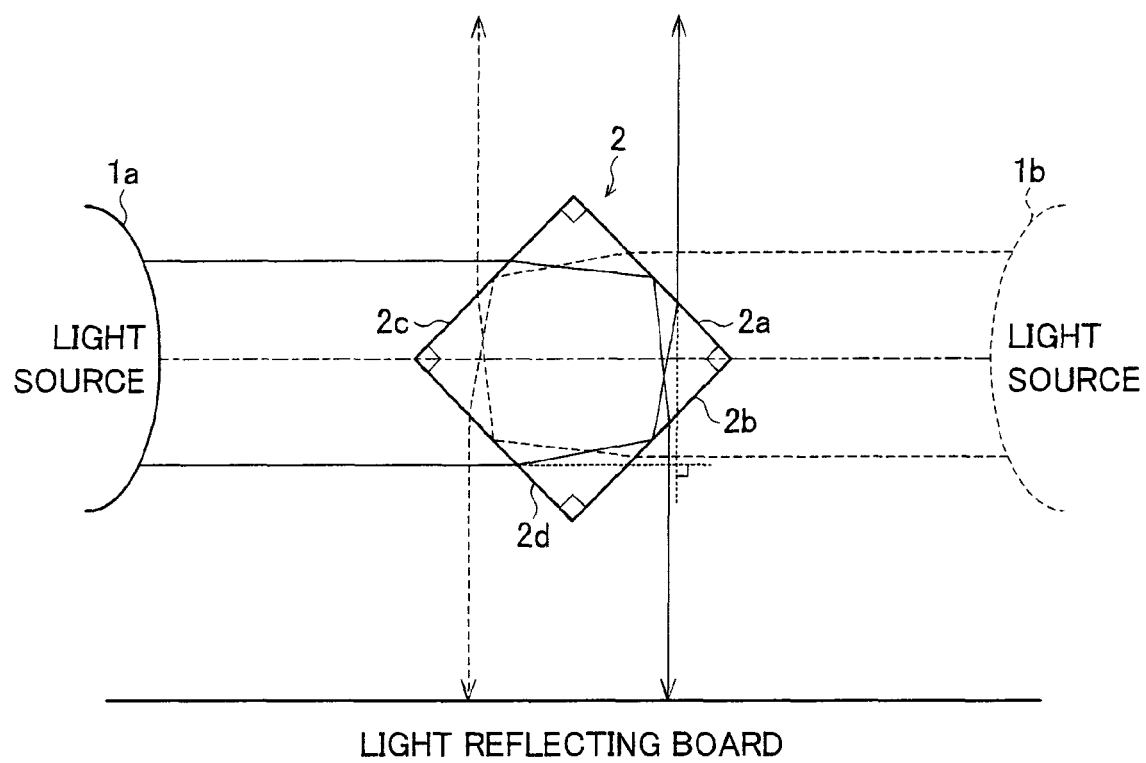
FIG. 3 explains a principle of refraction of a pseudo rod-like light source provided to the illumination device illustrated in FIG. 2.

The pseudo rod-like light source 2 is arranged along the rod-like light source 1, and, as illustrated in FIG. 3, preferably has a quadrangular column shape having a square cross sectional shape vertical to a longitudinal direction. The pseudo rod-like light source 2 is made of a non-light scattering material, such as transmissive glass or transmissive resin. The transmissive resin material may be, but not limited to, acrylic resin, polycarbonate resin, MS resin, and polystyrene resin, or the like.

What is important here is the pseudo rod-like light source 2 is provided adjacent to the rod-like light source 1, and has a light incidence plane through which light from the longitudinal direction of the rod-like light source 1 enters, a first light exit plane arranged to emit the incoming light from the light incidence plane toward the display panel, and a first light reflecting plane arranged to perform total reflection of the incoming light from the light incidence plane to the first light exit plane. In order to perform the function described above, that is, the function of total reflection of the incoming light, the pseudo rod-like light source 2 should be made of a material whose refractive index is higher than a refractive index of a space between the rod-like light source 1 and the pseudo rod-like light source 2.

In addition, the light reflecting sheet for reflecting the light is provided on a surface of the case 3, so that the light reflecting sheet is positioned on one side and the liquid crystal display panel 20 is positioned on the other side with respect to the rod-like light source 1 and pseudo rod-like light source 2.

The pseudo rod-like light source 2 includes a second light exit plane arranged to emit the incoming light from the light incidence plane toward the light reflecting sheet, and a second light reflecting plane arranged to perform total reflection of the incoming light from the light incidence plane to the second light exit plane.

In accordance with the present preferred embodiment, both the first light reflecting plane and second light reflecting plane are preferably arranged to perform total reflection of the incoming light, however, both the light reflecting planes do not have to perform total reflection. That is to say, it is possible to achieve a higher luminance sufficiently with one of the light reflecting planes for performing total reflection, even with none of them for performing total reflection.

Additionally, as described above, in accordance with the present preferred embodiment, the pseudo rod-like light source 2 preferably has the square cross sectional shape vertical to the longitudinal direction of the pseudo rod-like light source 2. However, the shape is not limited to that as long as it meets the following standards.

That is to say, as described above, it is preferable that the pseudo rod-like light source 2 has a quadrangular column shape, and is made of a non-light scattering material, and also at least one plane of the quadrangular column shape is inclined at approximately 45 degrees relative to the light exit plane of the rod-like light source 1, from which light exit plane, the light is emitted to the pseudo rod-like light source 2.

Specifically, the pseudo rod-like light source 2, as illustrated in FIG. 3, is so positioned that an angle of the pseudo rod-like light source 2 is on a line between the adjacent rod-like light sources 1. In this case, the refractive index of the pseudo rod-like light source 2 is set to perform total reflection of the light from the rod-like light sources 1 internally. For example, as illustrated in FIG. 3, the light emitted from a rod-like light source 1a enters the pseudo rod-like light source 2 through planes 2c and 2d (both of them are the light incidence planes at this time) of the pseudo rod-like light source 2, the planes 2c and 2d being located near from the rod-like light source 1a. The incoming light is refracted inside the pseudo rod-like light source 2, and totally reflected at inner planes 2a (the second light reflecting plane at this time) and 2b (the first light reflecting plane at this time). The incoming light totally reflected from the inner plane 2a exits toward a light reflecting board through the plane 2b (the second light exit plane at this time), which is between the plane 2a and the light reflecting board. On the other hand, the incoming light totally reflected from the plane 2b exits outside through the plane 2a (the first light exit plane at this time), which is adjacent to the plane 2b.

In the same way, light emitted from a rod-like light source 1b enters the pseudo rod-like light source 2 through the planes 2a and 2b (both are the light incidence planes at this time) of the pseudo rod-like light source 2, the plane 2a and 2b being located near from the rod-like light source 1b. The incoming light is refracted inside the pseudo rod-like light source 2, and totally reflected at inner planes 2c (the second light reflecting plane at this time) and 2d (the first light reflecting plane at this time). The incoming light totally reflected from the plane 2c exits toward the light reflecting board through the plane 2d (the second light exit plane at this time), which is located between the plane 2c and the light reflecting board. On the other hand, the incoming light totally reflected from the plane 2d exits outside through the plane 2c (the first light reflecting plane at this time), which is adjacent to the plane 2d.

Thus, the illumination device 10 adopting the aforementioned arrangement includes the pseudo rod-like light source 2 provided between the two rod-like light sources 1 that are adjacent to each other. Therefore, a portion of the light emitted from the rod-like light source 1 is refracted with the pseudo rod-like light source 2, so as to allow the illumination device 10 to strengthen a light intensity of the light from the region corresponding to the interval between the rod-like light sources 1. Accordingly, it is possible to reduce the luminance unevenness on a display plane of the liquid crystal display panel 20. The pseudo rod-like light source 2 provided between the rod-like light sources 1 refracts almost all the light from the rod-like light sources 1, and emits the light toward the liquid crystal display panel 20, so as to act as a light source in a pseudo manner. That is to say, the pseudo rod-like light source 2 strengthens the light intensity of the light emitted from the region corresponding to the interval between the rod-like light sources 1. Therefore, it is possible to have the same optical system as in a case where more rod-like light sources 1 are provided at shorter intervals. As a result, it is possible to reduce the luminance unevenness in not only the front direction (the normal direction of a display surface of the liquid crystal display device 30), but also in the oblique directions (the oblique directions to the normal direction of the display surface).

The effects of such a preferred embodiment of the present invention is described below with comparisons with the luminance unevenness of a conventional backlight.

FIGS. 4 to 7 show how the luminance unevenness occurs with the conventional direct backlight, and how the illumination device 10 according to a preferred embodiment of the present invention reduces the luminance unevenness.

Figure 4:
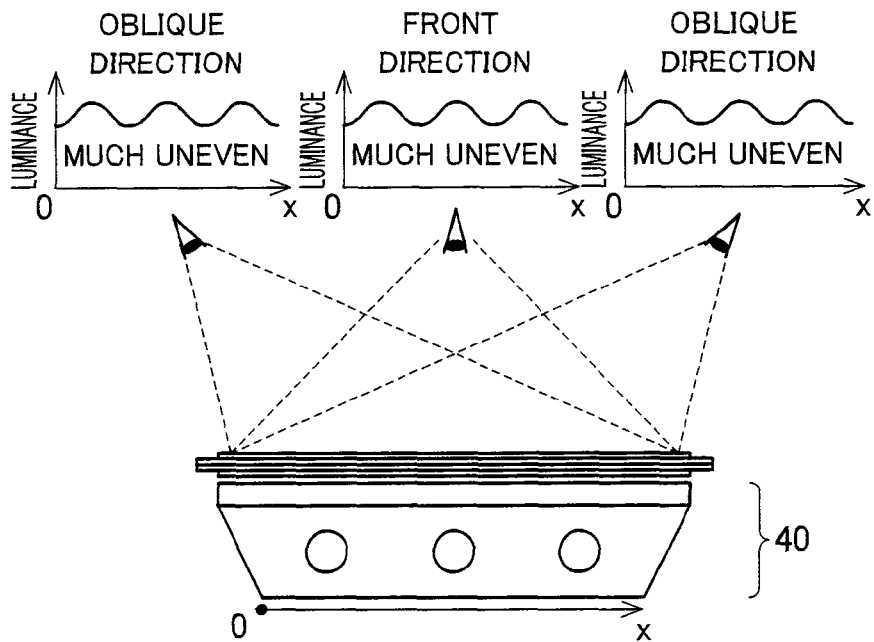
FIG. 4 is a view schematically showing how luminance unevenness occurs with a conventional direct backlight.

With the general conventional direct backlight 40, as illustrated in FIG. 4, the luminance unevenness is prominent in both the front direction and the oblique directions. Accordingly, a display quality is low.

Figure 5:
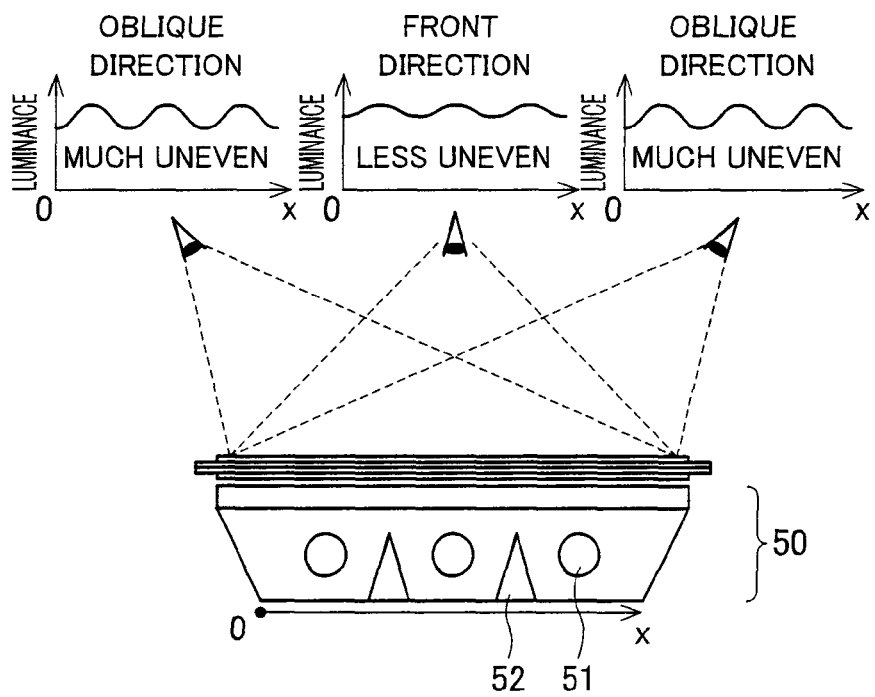
FIG. 5 is a view schematically showing how the luminance unevenness occurs with a conventional direct backlight.

On the other hand, a backlight 50 disclosed in Japanese Unexamined Patent Application Publication No. 2002-122863, as illustrated in FIG. 5, includes a protruding portion 52, which has a light reflectivity, provided between light sources 51. As a result, the light intensity of light emitted from a region corresponding to an interval between the light sources 51 is strengthened such that the luminance unevenness is reduced in the front direction. However, unlike the light scattering member 2 for scattering light in all directions, the protruding portion 52, which has the light reflectivity and whose cross sectional shape is a triangle, does not act like a light source in a pseudo manner. Therefore, the luminance unevenness in the oblique directions is not reduced sufficiently. Accordingly, the display quality can not be high sufficiently.

Figure 6:
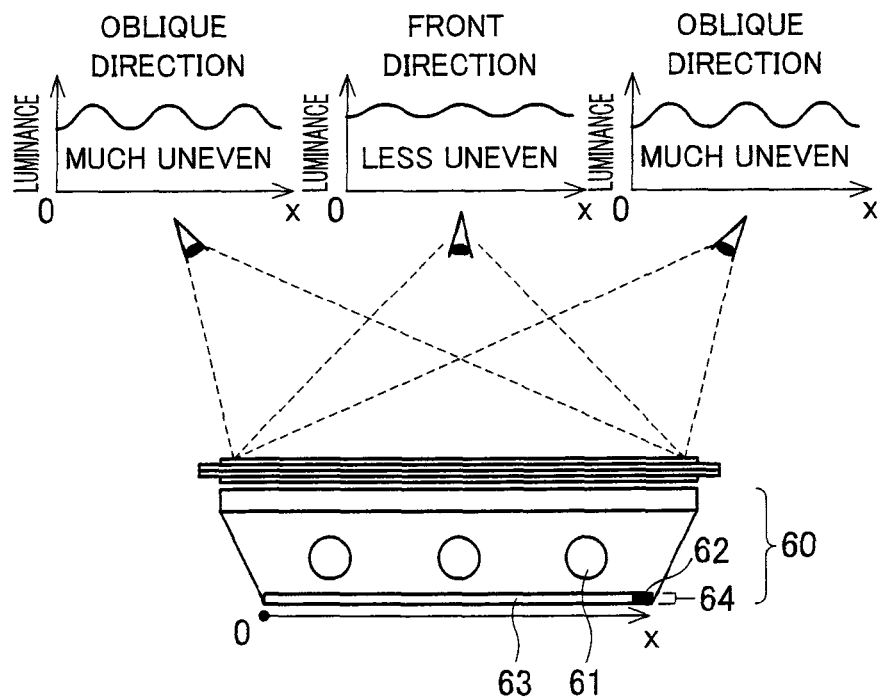
FIG. 6 is a view schematically showing how the luminance unevenness occurs with a conventional direct backlight.

Moreover, a backlight 60 disclosed in Japanese Unexamined Patent Application Publication No. 2000-310776, as illustrated in FIG. 6, includes an auxiliary light source 64 provided below a light source 61, and a light guide plate 63 of the auxiliary light source 64, the light guide plate having scattering dot patterns provided sparsely in a region directly below the light source 61, and densely in a region corresponding to an interval between the light sources 61. Therefore, the light intensity of light from the interval between the light sources 61 is strengthened, so as to reduce the luminance unevenness in the front direction. However, the auxiliary light source 64 is provided below, not between, the light sources 61, and emits light in a planar manner so that the auxiliary light source 64 can not act like a light source of the rod-like light sources 61 in a pseudo manner. As a result, the luminance unevenness in the oblique directions can not be reduced sufficiently. Accordingly, the display quality can not be improved sufficiently.

Figure 7:
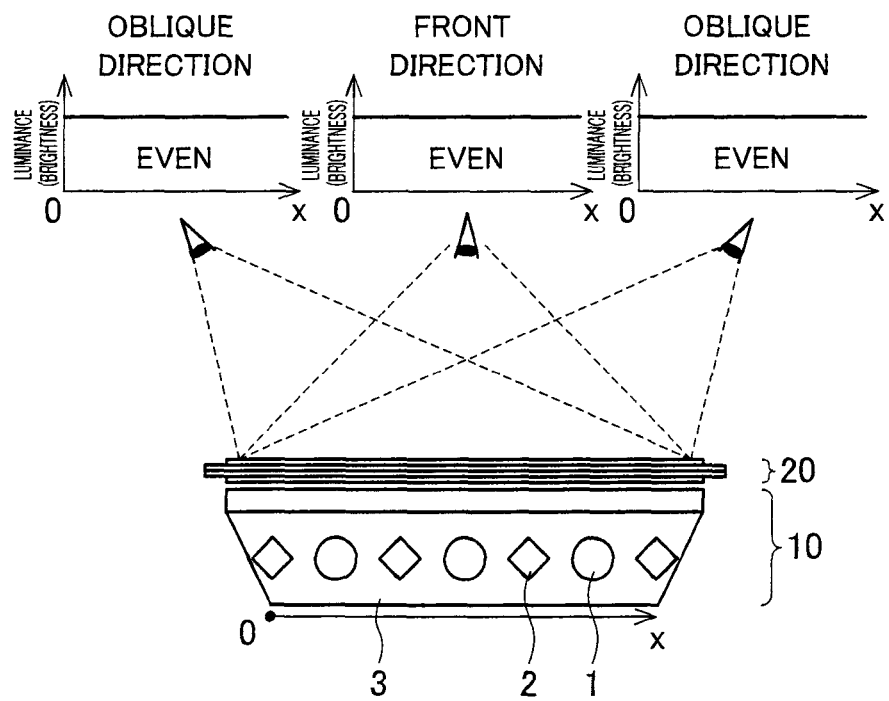
FIG. 7 is a view schematically showing how the illumination device according to a preferred embodiment of the present invention reduces the luminance unevenness.

On the other hand, with the illumination device 10 according to a preferred embodiment of the present invention, as illustrated in FIG. 7, the pseudo rod-like light source 2 is provided between the rod-like light sources 1 that are adjacent to each other, and acts like a light source in a pseudo manner, so as to reduce the luminance unevenness in not only the front direction but also the oblique directions. Therefore, the display device with the illumination device 10 according to a preferred embodiment of the present invention can display images with a high display quality. Moreover, with the pseudo rod-like light source 2 acting like a light source in a pseudo manner, it is possible to shorten the distance between the liquid crystal display panel 20 and the rod-like light sources 1 (the same as the distance A in FIG. 13) without increasing the number of the rod-like light sources 1. Therefore, the illumination device 10 makes it possible to be made thinner to highly commercially attractive, and to have a lower cost.

Figure 8A:
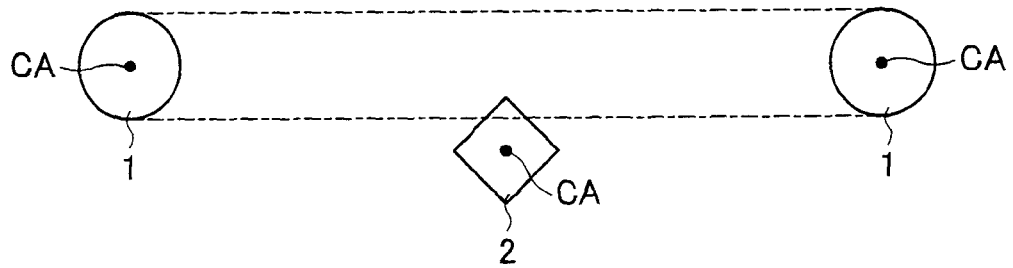
FIG. 8A shows an arrangement of the pseudo rod-like light source of the illumination device according to a preferred embodiment of the present invention.
Figure 8B:
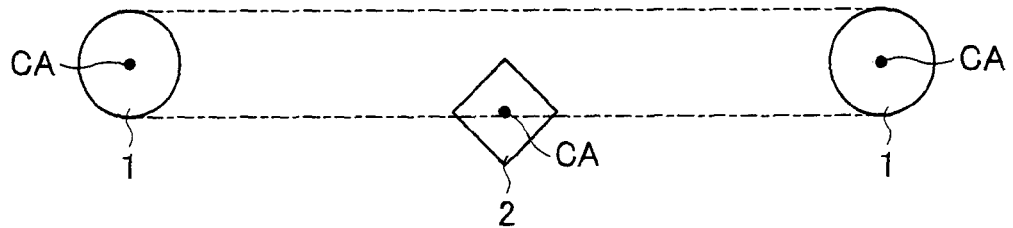
FIG. 8B shows an arrangement of the pseudo rod-like light source of the illumination device according to a preferred embodiment of the present invention.
Figure 8C:
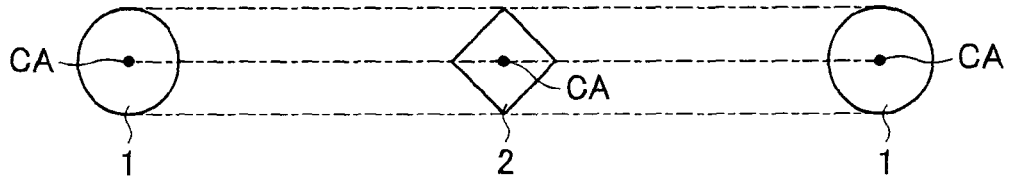
FIG. 8C shows an arrangement of the pseudo rod-like light source of the illumination device according to a preferred embodiment of the present invention.

As described above, with the illumination device 10 according to a preferred embodiment of the present invention, the pseudo rod-like light source 2, which refracts the light from the rod-like light source 1, acts like a light source in a pseudo manner, because the pseudo rod-like light source 2 is positioned with reference to not only planar positional relationship with the rod-like light sources 1 but also stereoscopic positional relationship with the rod-like light sources 1. The pseudo rod-like light source 2, as illustrated in FIG. 2, is provided between the rod-like light sources 1 not only in the normal direction of the display surface but also, as illustrated in FIG. 1, in the longitudinal direction of the rod-like light source 1. In addition, "the pseudo rod-like light source 2 is provided between the rod-like light sources 1 in the longitudinal direction of the rod-like light source 1" means, as illustrated in FIGS. 8A to 8C, that the pseudo rod-like light source 2 is positioned to have at least a portion thereof included in a space between the rod-like light sources 1. In order to reduce the luminance unevenness in the oblique directions, as illustrated in FIG. 8B, it is preferable to position a central axis CA (a virtual axis) of the pseudo rod-like light source 2 in the space between the rod-like light sources 1, and also to position, as illustrated in FIG. 8C, the central axis CA of the pseudo rod-like light source 2 and a plurality of central axes CA of the rod-like light sources 1 on the same plane practically (substantially at the same height). Particularly, it is preferable to provide a pair of the opposite angles of the pseudo rod-like light source 2 and the central axes CA of a plurality of the rod-like light sources 1 on the same plane practically (substantially at the same height).

Further, the pseudo rod-like light source 2 emits all the light from the rod-like light source 1 toward the light reflecting sheet and the display plane of the liquid crystal display panel 20, so consequently emits all the light entering the pseudo rod-like light source 2 toward the display plane of the liquid crystal display panel 20. Therefore, as illustrated in FIG. 1, not only when provided between the rod-like light sources 1 but also when provided at each far end in the case 3, the pseudo rod-like light source 2 can act like a light source in a pseudo manner sufficiently.

Figure 9:
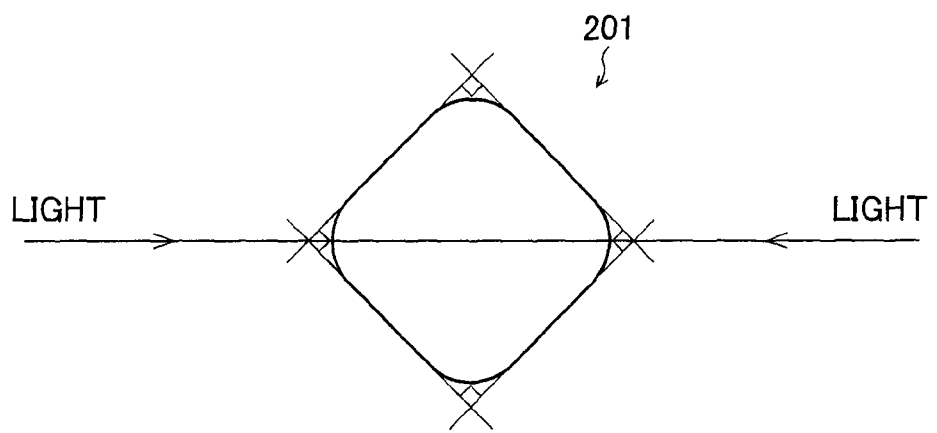
FIG. 9 shows another example of a cross sectional shape of the pseudo rod-like light source of the illumination device according to a preferred embodiment of the present invention, the cross sectional shape being vertical to a longitudinal direction of the pseudo rod-like light source.

Furthermore, in order to let the rod-like light source 2 act like a light source in a pseudo manner suitably, it is preferable that the pseudo rod-like light source 2 has a square cross sectional shape, as illustrated in FIG. 3. However, the cross sectional shape may be substantially a square (whose four angles are not the right angle), as of a pseudo rod-like light source 201 illustrated in FIG. 3. As long as an angle at an intersection of each extended side of the pseudo rod-like light source 201 is about 90 degrees. Additionally, even in a case of the pseudo rod-like light source 201, as illustrated in FIG. 9, it is preferable to have an angle of about 90 degrees at an intersection of each extended side thereof, and also to provide the pair of opposite angles of the pseudo rod-like light source 201 and the central axes CA of a plurality of the rod-like light sources 1 on the same plane substantially (substantially at the same height level).

Moreover, in order to let the light from the rod-like light source 1 enter the pseudo rod-like light source 2 efficiently, it is preferable that a length of a diagonal line of the cross sectional shape of the pseudo rod-like light source 2 should be longer than a diameter of the rod-like light source 1.

The present preferred embodiment describes the example in which the pseudo rod-like light source 2 has the substantially square cross sectional shape vertical to its longitudinal direction. However, other shapes may be applied in various preferred embodiments of the present invention.

In a case where the light from the rod-like light source 1 is required to be refracted, it is preferable to use a member having at least two straight sides of its cross sectional shape. In short, the member preferably has two planes that are adjacent to each other along the longitudinal direction of the pseudo rod-like light source 2. Specifically, in a case where the pseudo rod-like light source 2 is provided between the rod-like light sources 1, at least one pair of planes 2a and 2c or 2b and 2d is needed among four planes illustrated in FIG. 3. Further, in a case where the rod-like light source 2 is provided with the one rod-like light source 1, for example, in a case where the pseudo rod-like light sources 2 are provided at each far end of the case 3 illustrated in FIG. 1, at least one pair of planes 2c and 2d or 2a and 2b is needed. Furthermore, in the case where the rod-like light source 2 is provided with the one rod-like light source 1, for example, in the case of the pseudo rod-like light sources 2 provided at each far end of the case 3 illustrated in FIG. 1, at least one plane in the pair of 2c and 2d or at least one plane in the pair of 2a and 2b is needed.

In addition, in accordance with the present preferred embodiment, the one pseudo rod-like light source 2 is preferably provided between the two rod-like light sources 1 that are adjacent to each other. However, a plurality of the pseudo rod-like light sources 2 may be provided between the two rod-like light sources 1. As the present preferred embodiment shows, in a case where the one pseudo rod-like light source 2 is provided between the two rod-like light sources 1, it is preferable to provide the pseudo rod-like light source 2 at a substantial midpoint between the two rod-like light sources 1. With the arrangement, the pseudo rod-like light source 2 is at the substantial midpoint between the two rod-like light sources, it becomes possible to have a significant effect of reducing the luminance unevenness.

Further, the cross sectional shape of the pseudo rod-like light source 2, which cross sectional shape is vertical to the longitudinal direction of the pseudo rod-like light source 2, may be either bigger or smaller than the diameter of the rod-like light source 1. For example, in a case where the cross sectional shape of the pseudo rod-like light source 2, which cross sectional shape is vertical to the longitudinal direction of the pseudo rod-like light source 2, is bigger than the diameter of the rod-like light source 1, it is possible to have a higher luminance, and in a case where the cross sectional shape is smaller than the diameter, it is possible to have a low luminance. That is to say, by changing a size of the cross sectional shape of the pseudo rod-like light source 2, which cross sectional shape is vertical to the longitudinal direction of the pseudo rod-like light source 2, it is possible to adjust the luminance of the pseudo rod-like light source 2.

Further, it is also possible to adjust the luminance of the pseudo rod-like light source 2 by changing the distance between the rod-like light sources 1 and the pseudo rod-like light source 2.

Figure 10:
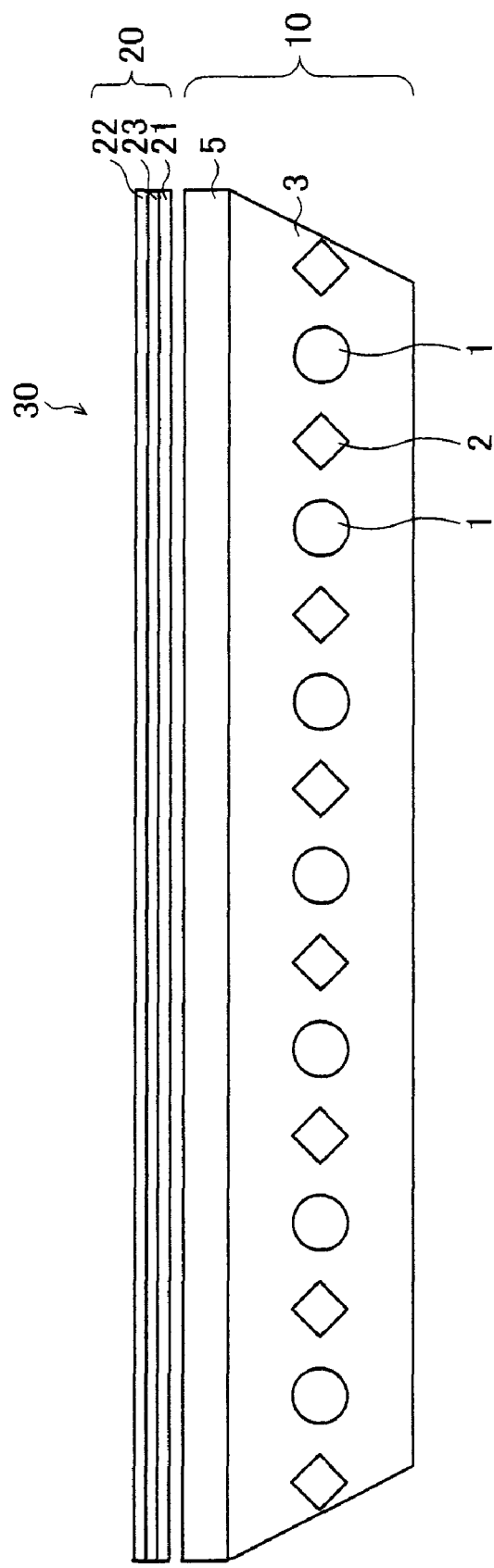
FIG. 10 is a schematic cross-section view of another liquid crystal display device with the illumination device according to a preferred embodiment of the present invention.
Figure 11:
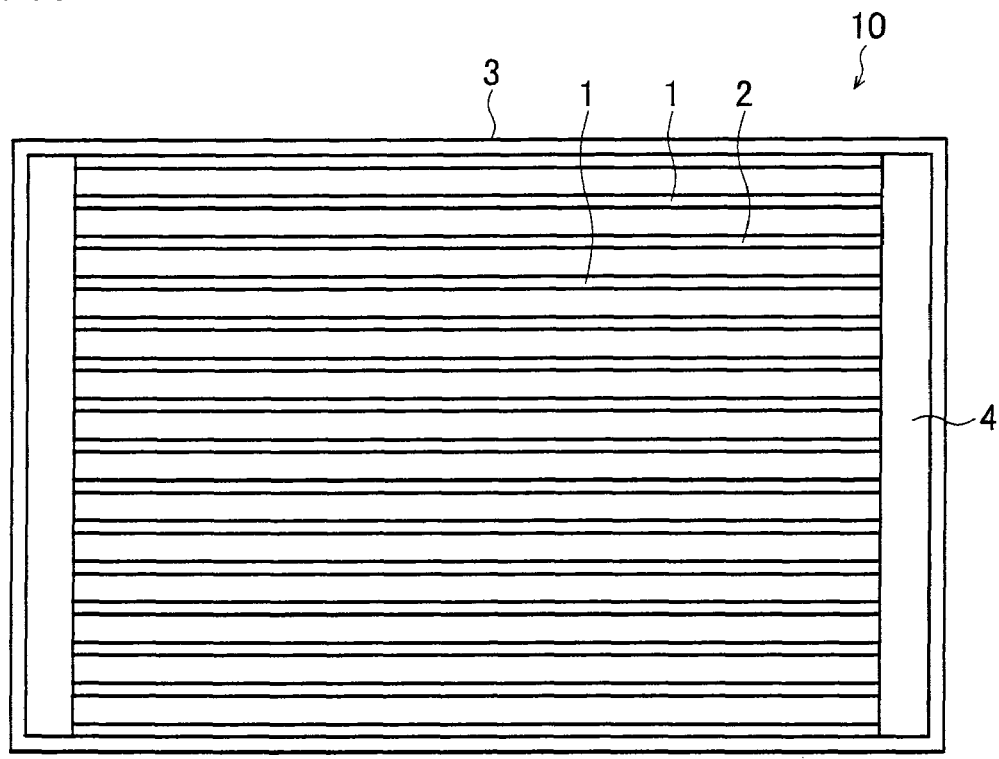
FIG. 11 is a schematic plan view of the illumination device illustrated in FIG. 10.

Additionally, FIGS. 1 and 2 explain an example where three rod-like light sources 1 are preferably provided, however, this is just for making the present invention easily understood. The number of the rod-like light sources 1 is not limited to that. As illustrated in FIGS. 10 and 11, it is possible to provide more than three rod-like light sources 1. In this case, too, the pseudo rod-like light source 2 also should be provided between the rod-like light sources 1 that are adjacent to each other.

Second Preferred Embodiment

Another preferred embodiment of the present invention is described below.

Figure 12:
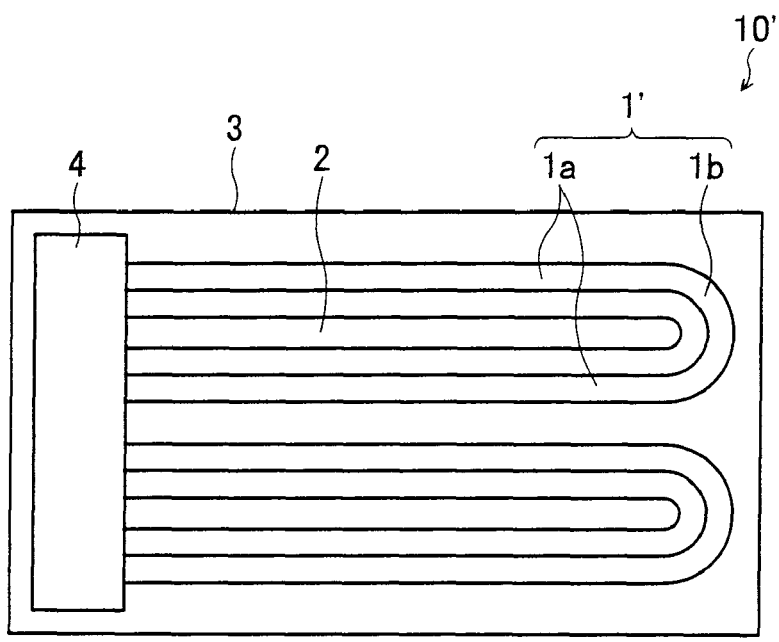
FIG. 12 is a schematic plan view of another illumination device according to a preferred embodiment of the present invention.

FIG. 12 is a plan view showing an illumination device 10' in accordance with the present preferred embodiment, as a backlight provided on a backside (backside to a viewer's sight) of a liquid crystal display panel.

The following describes mainly differences between the illumination device 10' and the illumination device 10 described in the first preferred embodiment.

The illumination device 10', as illustrated in FIG. 12, preferably includes a substantially U-shaped light source 1'. The light source 1' includes a plurality of rod-like portions (rod-like light emitting portions) 1a arranged substantially parallel to each other, and a bending portion 1b for connecting the two rod-like portions 1a that are adjacent to each other. The light source 1' in accordance with the present preferred embodiment is a cold cathode fluorescent tube. However, the light source 1' may be a hot cathode fluorescent tube.

The illumination device 10' includes a pseudo rod-like light source 2, which scatters light, provided between the two rod-like portions 1a that are adjacent to each other. The pseudo rod-like light source 2 in accordance with the present preferred embodiment preferably has the same substantial rectangular column shape extended in a longitudinal direction as in the first preferred embodiment described above. As illustrated in FIG. 3, the pseudo rod-like light source 2 is made of a transmissive member, whose cross sectional shape being vertical to the longitudinal direction is substantially a square, and provided at a substantial midpoint between the two rod-like portions 1a that are adjacent to each other, and also provided substantially parallel to the rod-like portion 1a.

The light source 1' and the light scattering member 2 are held in a case 3 with a supporting member (a holder) 4 provided inside the case 3. In addition, an optical sheet (not illustrated) may be provided in front of the light source 1' and the light scattering member 2 (so that the optical sheet is between the viewer and them), if necessary.

With the illumination device 10' in accordance with the present preferred embodiment, the pseudo rod-like light source 2 provided between the two rod-like portions that are adjacent to each other acts like a light source as well in a pseudo manner. Therefore, it is possible to have the same optical system as in a case where more the rod-like portions 1a of the light sources 1' are provided at shorter intervals. As a result, the luminance unevenness can be reduced in not only the front direction but also the oblique directions.

As for a preferred shape or position of the pseudo rod-like light source 2, the second preferred embodiment is almost the same as described in the first preferred embodiment. Specifically, in order to reduce the luminance unevenness in the oblique directions, it is preferable to provide a central axis (a virtual axis) of the pseudo rod-like light source 2 in the space between the two rod-like portions 1a, and also provide the central axis of the pseudo rod-like light source 2 and central axes of a plurality of the rod-like portions 1a on the same plane practically (substantially at the same height).

Further, in order to let the pseudo rod-like light source 2 act as a light source suitably in a pseudo manner, it is preferable that the pseudo rod-like light source 2 has light distribution characteristics that are similar to the rod-like portion 1a. In order to give the pseudo rod-like light source 2 the light distribution characteristics similar to the rod-like portion 1a, it is preferable to apply a column shape for the pseudo rod-like light source 2, and also to provide the columnar pseudo rod-like light source 2 substantially parallel to the rod-like portion 1a, as in the present preferred embodiment.

Furthermore, as in the present preferred embodiment, in a case where the light scattering member 2 is provided between the two rod-like portions 1a, it is preferable to provide the pseudo rod-like light source 2 at the substantial midpoint between the two rod-like portions 1a.

In addition, even though the present preferred embodiment describes the example in which the substantially U-shaped light source 1' includes the two rod-like portions 1a and the one bending portion 1b, it is possible to replace the substantially U-shaped light source 1' with a light source that includes further more rod-like portions and bending portions, such as a W-shaped light source including four rod-like portions and three bending portions. With the light source including a plurality of the rod-like portions, and bending portions for connecting adjacent rod-like portions, it is possible to decrease the number of the light sources compared with the case of using the rod-like light sources, thereby resulting in a decrease in cost.

Third Preferred Embodiment

Figure 13:
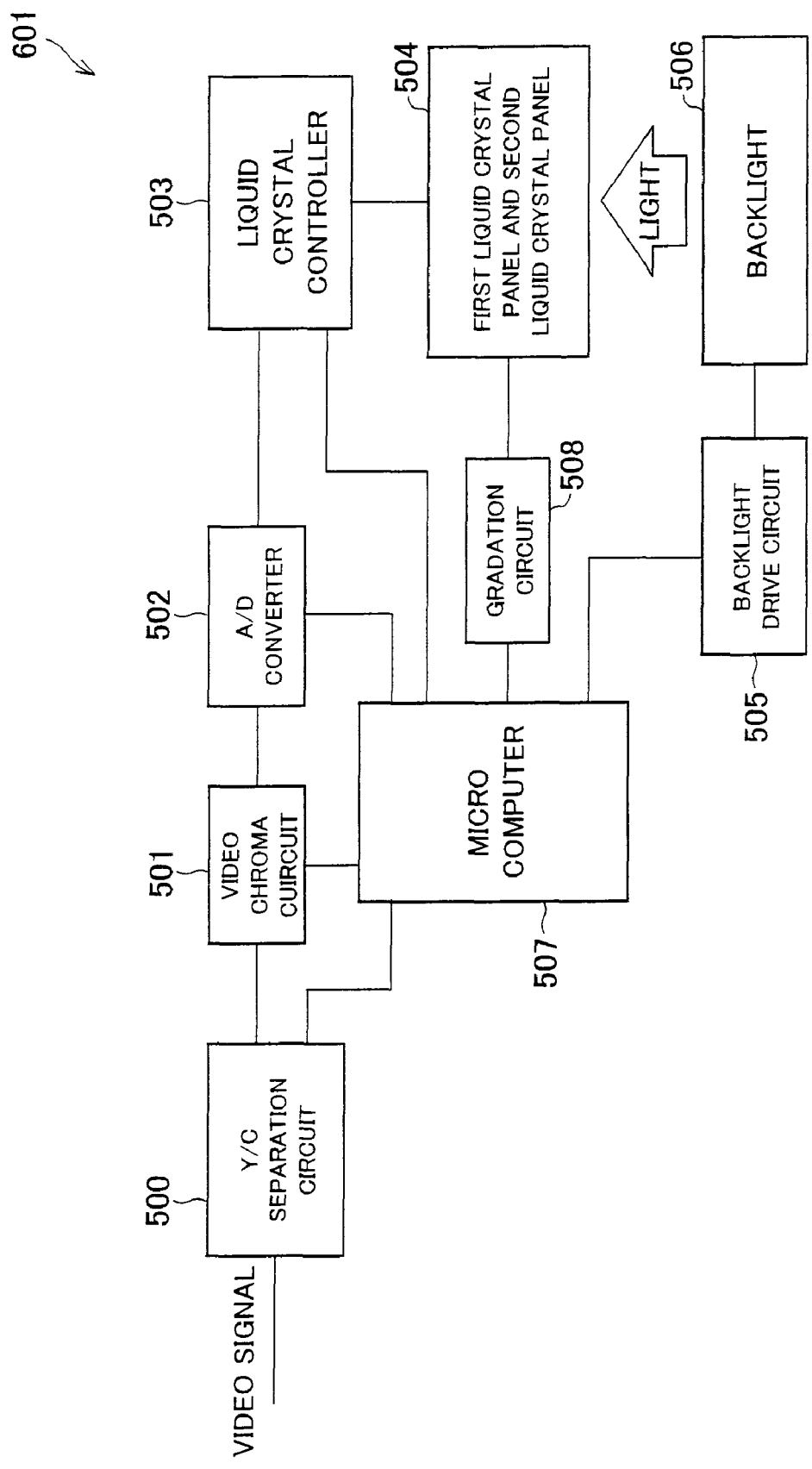
FIG. 13 is a schematic block diagram of a television receiver provided with the liquid crystal display device according to a preferred embodiment of the present invention.
Figure 14:
FIG. 14 is a block diagram showing relationship between a tuner section and the liquid crystal display device of the television receiver of FIG. 13.
Figure 15:
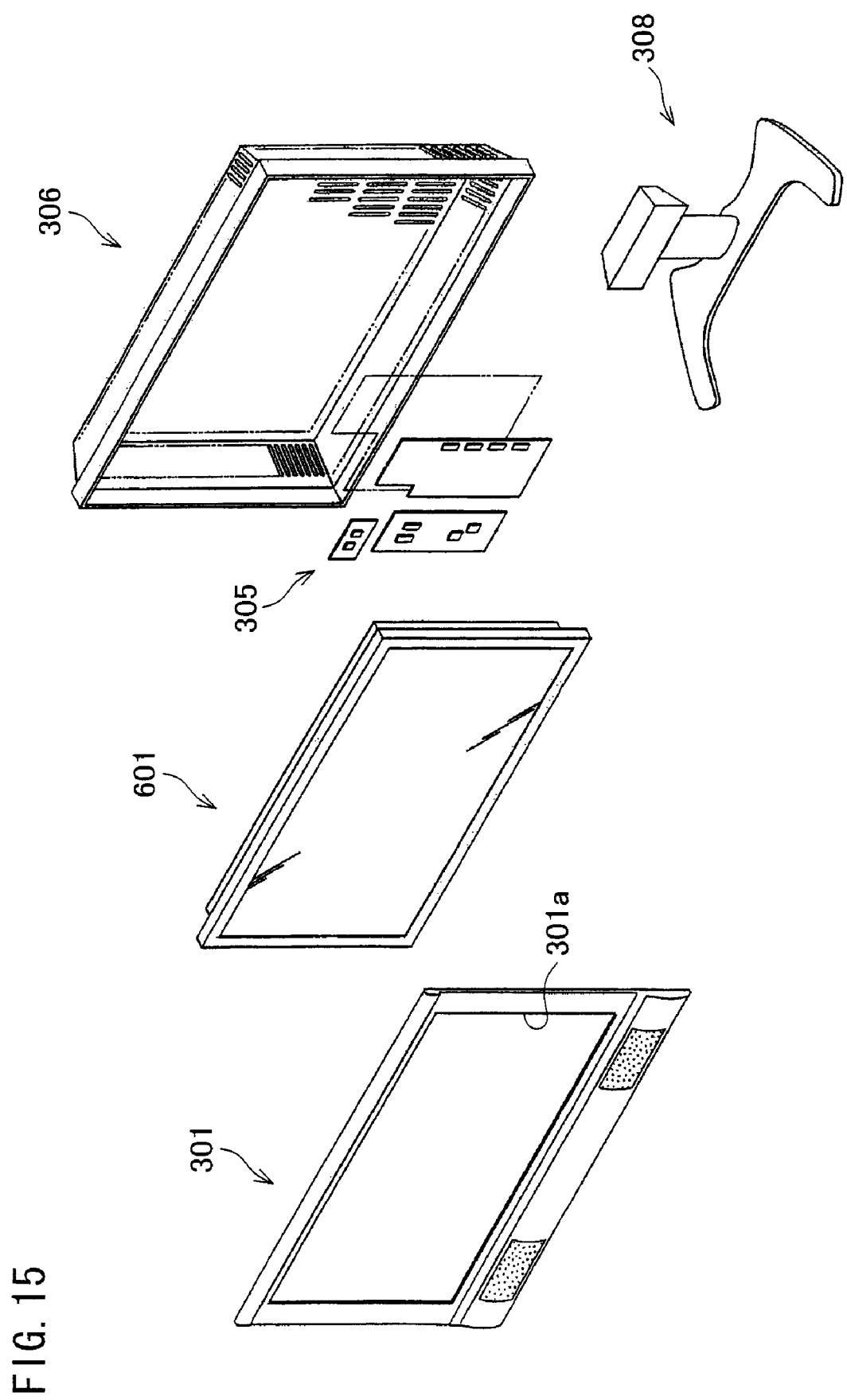
FIG. 15 is an exploded perspective view of the television receiver of FIG. 13.
Figure 16:
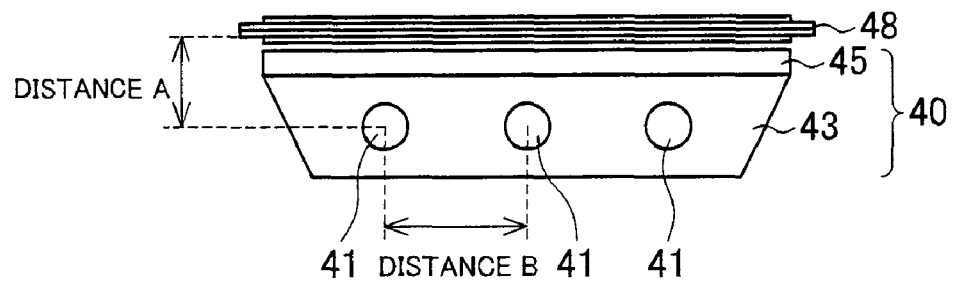
FIG. 16 is a schematic cross-section view of a general conventional direct backlight.
Figure 17:
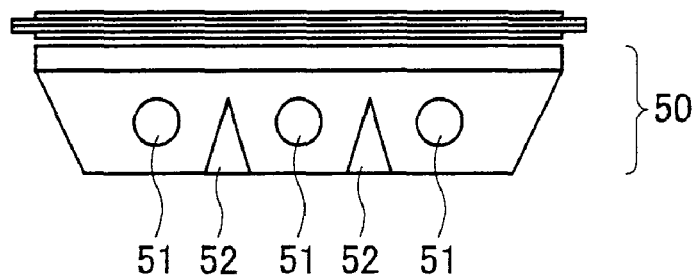
FIG. 17 is a schematic cross-section view of a conventional direct backlight.
Figure 18:
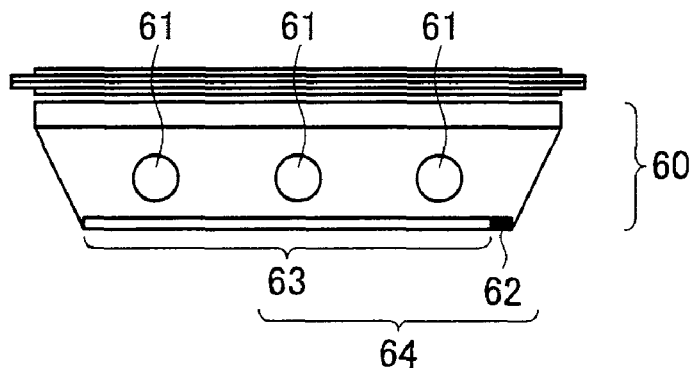
FIG. 18 is a schematic cross-section view of a conventional direct backlight.

The following describes a television receiver adopting an illumination device according to various preferred embodiments of the present invention, with reference to FIGS. 13 to 15.

FIG. 13 shows a circuit block of a liquid crystal display device 601 for the television receiver.

The liquid crystal display device 601, as illustrated in FIG. 13, includes a Y/C separation circuit 500, a video chroma circuit 501, an A/D converter 502, a liquid crystal controller 503, a liquid display panel 504, a backlight drive circuit 505, a backlight 506, a microcomputer 507, and a gradation circuit 508.

The liquid crystal panel 504 includes a first liquid crystal panel and a second liquid crystal panel, and any arrangement described in the aforementioned preferred embodiments can be applied.

With the liquid crystal display device 601 adopting the arrangement described above, first of all, an input video signal of a television signal is inputted into the Y/C separation circuit 500, and then separated into a luminance signal and a color signal. At the video chroma circuit 501, the luminance signal and color signal are converted into R, G and B, which are three primary colors, and after that, the analog RGB signal are converted into a digital RGB signal by the A/D converter 502, and thereafter inputted into the liquid crystal controller 503.

To the liquid crystal panel 504, the RGB signal from the liquid crystal controller 503 is inputted at a prescribed timing, at the same time, gradation voltages of R, G and B are provided from the gradation circuit 508, thereby displaying images. The microcomputer 507 controls a whole system, including these processings.

Additionally, it is possible to display images according to various video signals, such as a video signal for a television broadcast, a video signal taken with a video camera, a video signal provided via the Internet or the like.

Further, a tuner section 600 illustrated in FIG. 14 receives the television broadcast and outputs the video signal thereof, and the liquid crystal display device 601 displays images (pictures) according to the video signal outputted from the tuner section 600.

Furthermore, in a case of using the liquid crystal display device adopting the aforementioned arrangement as the television receiver, for example, as illustrated in FIG. 15, a first housing 301 and a second housing 306 hold all the liquid crystal display device 601 therebetween, as if they cover the liquid crystal display device 601.

The first housing 301 includes an opening portion 301a for passing therethrough an image that is displayed at the liquid crystal display device 601.

In addition, the second housing 306 covers a backside of the liquid crystal display device 601, the second housing 306 including a controlling circuit 305 to control the liquid crystal display device 601, and a supporting member 308 attached thereunder.

As described above, with the television receiver adopting the aforementioned arrangement, it is possible to provide a high display quality image having no luminance unevenness, and to make a thin illumination device, so as to make the television receiver further thinner.

The present invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The present invention attains that luminance unevenness can hardly occur on a light irradiation plane. Therefore, the present invention is preferably applicable to a liquid crystal display device, particularly to a television receiver, a monitor for a computer, a monitor for a broadcast and the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An illumination device provided on a backside of a display panel so as to irradiate the display panel with light, the illumination device comprising:
   a plurality of rod-shaped light sources arranged in a planar configuration such that the light sources do not cross each other; and
   columnar members being respectively provided adjacent to the rod-shaped light sources, each of the columnar members including:
      a light incidence plane through which light emitted from a longitudinal direction of at least one of the rod-shaped light sources enters;
      a light exit plane arranged to emit incoming light from a light incidence plane toward the display panel; and
      a light reflecting plane arranged to reflect the incoming light from the light incidence plane to the light exit plane; wherein
   each of the columnar members has a quadrangular column shape including at least one corner that is provided on an imaginary straight line that is parallel or substantially parallel to the display panel and that passes through corresponding adjacent ones of the rod-shaped light sources.

2. The illumination device according to claim 1, wherein the light reflecting plane is arranged to perform total reflection of the incoming light from the light incidence plane to the light exit plane.

3. The illumination device according to claim 1, further comprising:
   a light reflecting sheet arranged to reflect light, being positioned on one side with respect to the at least one rod-shaped light source and the columnar members while the display panel is positioned on the other side with respect to the at least one rod-shaped light source and the columnar members, each of the columnar members including:
      a light exit plane arranged to emit the incoming light from the light incidence plane toward the light reflecting sheet; and
      a light reflecting plane arranged to reflect the incoming light from the light incidence plane to the light exit plane of the columnar member.

4. The illumination device according to claim 3, wherein the light reflecting plane of the columnar member is arranged to perform total reflection of the incoming light from the light incidence plane to the light exit plane of the columnar member.

5. The illumination device according to claim 1, wherein each of the columnar members is made of a non-light scattering material, the quadrangular column shape has at least one plane that is inclined at about 45 degrees relative to imaginary straight line, and the at least one corner includes a right angle.

6. The illumination device according to claim 5, wherein the quadrangular column shape has a square cross sectional shape that is vertical to a longitudinal direction of the quadrangular column shape.

7. The illumination device according to claim 1, wherein a longitudinal central axis of the columnar member and longitudinal central axes of a plurality of the rod-shaped light sources are positioned on the same plane.

8. A display device comprising:
   a display panel arranged to display images by modulating light; and
   an illumination device according to claim 1 arranged on a backside of the display panel to irradiate the display panel with the light.

9. A television receiver comprising:
   a tuner section arranged to receive a television broadcast; and
   a display device arranged to display the television broadcast received at the tuner section, the display device including:
      a display panel arranged to display images by modulating light; and
      an illumination device arranged on a backside of the display panel to irradiate the display panel with the light, the illumination device including:
         a plurality of rod-shaped light sources arranged in a planar configuration such that the light sources do not cross each other; and
         columnar members being respectively provided adjacent to the rod-shaped light sources, each columnar member including:

a light incidence plane through which light emitted from a longitudinal direction of the rod-shaped light source enters;
a light exit plane arranged to emit incoming light from a light incidence plane toward the display panel; and
a light reflecting plane arranged to reflect the incoming light from the light incidence plane to a light exit plane; wherein
each of the columnar members has a quadrangular column shape including at least one corner that is provided on an imaginary straight line that is parallel or substantially parallel to the display panel and that passes through corresponding adjacent ones of the rod-shaped light sources.

\* \* \* \* \*